United States Patent [19]

Bird et al.

[11] 3,899,578

[45] Aug. 12, 1975

[54] GRISEOFULVIN COMPOSITIONS

[75] Inventors: Margaret Ellen Bird; Norman Senior, both of Macclesfield, England

[73] Assignee: Imperial Chemical Industries Limited, London, England

[22] Filed: May 14, 1974

[21] Appl. No.: 469,860

Related U.S. Application Data

[63] Continuation-in-part of Ser. No. 245,658, April 19, 1972, abandoned.

[30] Foreign Application Priority Data

May 24, 1971 United Kingdom............... 16624/71

[52] U.S. Cl.................................. 424/81; 424/180
[51] Int. Cl.² ................... A61K 31/78; A61K 31/70
[58] Field of Search...................... 424/180, 285, 81

[56] References Cited

UNITED STATES PATENTS

| | | | |
|---|---|---|---|
| 2,900,304 | 8/1959 | Martin | 424/285 |
| 2,986,496 | 5/1961 | Rhodes et al. | 424/285 |
| 3,008,876 | 11/1961 | Rhodes et al. | 424/285 |

Primary Examiner—Albert T. Meyers
Assistant Examiner—Daren M. Stephens
Attorney, Agent, or Firm—Cushman, Darby & Cushman

[57] ABSTRACT

Topical griseofulvin compositions comprising a solution of griseofulvin in a solvent, of which benzyl alcohol, dimethyl phthalate, propylene carbonate and eugenol are preferred, and a pharmaceutical excipient.

4 Claims, No Drawings

GRISEOFULVIN COMPOSITIONS

This application is a continuation-in-part of Ser. No. 245,658, filed Apr. 19, 1972 now abandoned.

This invention relates to new griseofulvin compositions and more particularly it relates to new griseofulvin compositions for topical application.

Griseofulvin is a known antifungal agent which is usually administered orally, and when so administered it is effective. However, since fungal lesions often occur on the skin there is a need for an effective topical formulation of griseofulvin which can be used either alone or in conjunction with orally administered griseofulvin in order to improve or shorten a particular course of treatment. The problem of producing an effective topical formulation of griseofulvin has been investigated for at least ten years and only a minimal success has been achieved. The present invention provides an effective topical formulation of griseofulvin and is based on the discovery that griseofulvin is sufficiently soluble in certain specific pharmaceutically-acceptable solvents to enable formulations to be made in which the griseofulvin remains in solution. It has been found that the solubility of griseofulvin at 20°C. in these solvents is as follows:

| | |
|---|---|
| propylene carbonate | 2% w/w |
| dimethylphthalate | 2% w/w |
| 3-phenoxypropanol | 3% w/w |
| 4-chlorophenoxyethanol | 3% w/w |
| phenoxyethanol | 4% w/w |
| phenylethanol | 4% w/w |
| eugenol | 6% w/w |
| benzyl alcohol | 8% w/w |

According to the invention there is provided a solution of griseofulvin in propylene carbonate, dimethyl phthalate, 3-phenoxypropanol, 4-chlorophenoxyethanol, phenoxyethanol, phenylethanol, eugenol or benzyl alcohol or in a mixture of any two or three of these solvents.

Of the solvents listed above, benzyl alcohol, in particular, together with dimethyl phthalate, propylene carbonate and eugenol are preferred, and the other solvents are preferably used in admixture with at least one of the preferred group. In general, a useful solution of griseofulvin in any of the above solvents or mixtures thereof will contain at least 0.5 percent by weight of griseofulvin.

As indicated above, the solutions of the invention are useful in the preparation of pharmaceutical compositions for topical application.

According to a further feature of the invention there is provided a pharmaceutical composition for topical application comprising griseofulvin dissolved in propylene carbonate, dimethyl phthalate, 3-phenoxypropanol, 4-chlorophenoxyethanol, phenoxyethanol, phenylethanol, eugenol or benzyl alcohol or in a mixture of any two or three of these solvents.

A composition of the invention may also contain one or more other pharmaceutically-acceptable liquids, for example ethanol, n-propanol, isopropanol, propylene glycol, glycerol, but these liquids are regarded more as diluents than solvents since griseofulvin is only sparingly soluble in any of them. Clearly they may only be incorporated in a pharmaceutical composition to an extent which does not cause the griseofulvin to be precipitated from solution in the main solvent, and this can be readily determined by experiment.

A composition of the invention may be in the form of a solution, a gel, an anhydrous ointment, a paste or an emulsion, of which a gel formulation is preferred. Each of these types of formulation is obtained by conventional procedures and by using conventional excipients.

Thus, a gel is obtained by adding a gelling agent to a solution of the griseofulvin as defined above, and examples of suitable gelling agents are carboxypolymethylene, polyvinylpyrrolidone, polyvinyl acetate, cellulose derivatives such as methyl-, ethyl-, hydroxyethyl-, hydroxypropylmethyl- or sodium carboxymethyl- cellulose, alginates, bentonites and silica.

A preferred gel formulation comprises a solution of griseofulvin in a mixture of benzyl alcohol and dimethyl phthalate, a diluent being propylene glycol or glycerol, and a gelling agent being carboxypolymethylene, hydroxyethylcellulose or sodium carboxymethylcellulose.

An anhydrous ointment is obtained by dispersing a solution of griseofulvin as defined in an essentially immiscible organic phase, for example soft paraffin, optionally in the presence of an emulsifying and/or thickening agent, for example sorbitan monostearate.

A paste may be obtained by thickening a solution of griseofulvin as defined with a solid material such as magnesium stearate, zinc oxide, a silicate or starch, and emulsions such as creams and lotions are obtained by mixing a solution of griseofulvin as defined with a suitable emulsifying system and water.

The compositions should contain from 0.1 to 8 percent w/w of griseofulvin, conveniently 0.25–5 percent w/w or, preferably, 1–3 percent w/w or even 2–3 percent w/w. The preferred gels should also contain benzyl alcohol, 15–40 percent w/w, dimethyl phthalate, 5–25 percent w/w and propylene glycol or a mixture of propylene glycol and glycerol, 35–55 percent w/w.

The compositions are applied to the infected area as required and may also contain other pharmacologically-active ingredients, for example antibacterial agents, other anti-fungal agents, keratolytic agents or anti-inflammatory, anti-pruritic or vasodilatory agents, as well as conventional excipients such as colours, chelating agents or preservatives as desired.

The invention is illustrated but not limited by the following Examples in which the percentages are by weight, and the following materials are referred to by their trade marks:

| | |
|---|---|
| 'Gasil' 23 | a grade of silica available from J. Crosfield & Son Ltd., Warrington, U.K. |
| 'Carbopol' 940 | a grade of carboxypolymethylene available from B.F. Goodrich Chem. Co., Cleveland, U.S.A. |
| 'Ethomeen' C25 | a grade of polyethoxylated coco fatty acid amide available from Armour Industrial Chemical Co., Chicago, U.S.A. |
| 'Natrosol' 250 HH | a grade of hydroxyethylcellulose available from Hercules Powder Co., Wilmington, U.S.A. |
| 'Edifas' B | grade of sodium carboxymethyl-cellulose available from I.C.I. London, U.K. |
| 'Hibitane' | chlorhexidine available from I.C.I., London, U.K. |
| 'Topanol' BHT | 4-methyl-2,6-di-t-butylphenol available from I.C.I., London, U.K. |

Examples 1-6 illustrate solutions of griseofulvin in a mixture of solvents.

Example 1

| | |
|---|---|
| Griseofulvin | 2.0 |
| Benzyl alcohol | 10.0 |
| Dimethyl phthalate | 88.0 |

The griseofulvin is dissolved in a mixture of the solvents by gentle heating.

Example 2

| | |
|---|---|
| Griseofulvin | 1.5 |
| 3-phenoxypropanol | 10.0 |
| Dimethyl phthalate | 88.5 |
| Process as example 1. | |

Example 3

| | |
|---|---|
| Griseofulvin | 4.0 |
| Wool fat | 15.0 |
| Eugenol | 81.0 |

The griseofulvin is dissolved in the eugenol by gentle heating and the wool fat is then added and dissolved.

Example 4

| | |
|---|---|
| Griseofulvin | 1.0 |
| Dimethyl phthalate | 49.0 |
| Propylene glycol | 50.0 |

The griseofulvin is dissolved in the dimethyl phthalate with gentle heating whereupon the propylene glycol is added and mixed. The solution should be stored in a warm place.

Example 5

| | |
|---|---|
| Griseofulvin | 2.0 |
| Benzyl alcohol | 25.0 |
| Dimethyl phthalate | 35.0 |
| Ethanol | 38.0 |

The griseofulvin is dissolved in a mixture of the benzyl alcohol and the dimethyl phthalate by gentle heating whereupon the alcohol is added and the solution allowed to cool.

Propylene glycol or polyethylene glycol 300 may be substituted for the ethanol.

Example 6

| | |
|---|---|
| Griseofulvin | 0.50 |
| Salicylic acid | 0.50 |
| Dimethyl phthalate | 50.0 |
| Propylene glycol | 49.0 |

The griseofulvin and the salicylic acid are dissolved in the mixed solvents with gentle heating followed by cooling. The solution should be stored in a warm place.

Examples 7-12 illustrate gels containing griseofulvin.

Example 7

| | |
|---|---|
| Griseofulvin | 2.0 |
| Benzyl alcohol | 20.0 |
| Dimethyl phthalate | 35.0 |
| Isopropyl myristate | 23.0 |
| Silica ('Gasil' 23) | 15.0 |

The griseofulvin is dissolved in a mixture of the benzyl alcohol and dimethyl phthalate by gentle heating. Isopropyl myristate is then added. The silica is then incorporated with stirring until a uniform opaque gel is formed.

Example 8

| | |
|---|---|
| Griseofulvin | 0.50 |
| Dimethyl phthalate | 50.0 |
| Propylene glycol | 33.0 |
| Silica ('Gasil' 23) | 16.5 |

The griseofulvin is dissolved in the dimethyl phthalate by gentle heating and the propylene glycol is then added. The silica is then incorporated with stirring until a uniform opaque gel is formed.

Example 9

| | |
|---|---|
| Griseofulvin | 2.0 |
| Benzyl alcohol | 20.0 |
| Dimethyl phthalate | 20.0 |
| Propylene glycol | 54.5 |
| 'Carbopol' 940 | 1.0 |
| Ethanol | 2.0 |
| 'Ethomeen' C25 | 0.5 |

The griseofulvin is dissolved in a warm mixture of the benzyl alcohol and the dimethyl phthalate. The 'Carbopol' 940 is dispersed in this solution and then the propylene glycol is added with stirring until mixing is complete. The 'Ethomeen' C25 dissolved in the ethanol is added with stirring until a uniform clear gel is formed.

Example 10

| | |
|---|---|
| Griseofulvin | 1.0 |
| Benzyl alcohol | 16.0 |
| Dimethyl phthalate | 9.0 |
| Propylene glycol | 52.0 |

-Continued

Example 10

| | |
|---|---|
| Sodium edetate | 0.025 |
| 'Carbopol' 940 | 0.80 |
| Triethanolamine | 0.16 |
| Purified Water | 21.015 |

The griseofulvin is dissolved in a warm mixture of the benzyl alcohol and dimethyl phthalate. The 'Carbopol' 940 is then dispersed in this liquid. To the cooled solution is added, with fast stirring, a solution of the sodium edetate in the water. The propylene glycol is then added with stirring until a clear homogeneous solution is formed. It is then left to stand until the entrapped air has dispersed. The triethanolamine is then added with stirring until a uniform clear gel is formed.

Similar gels may be prepared in which the dimethyl phthalate is replaced by an equal weight of propylene carbonate or 3-phenoxypropanol.

Example 11

| | |
|---|---|
| Griseofulvin | 1.0 |
| Benzyl alcohol | 16.0 |
| Dimethyl phthalate | 9.0 |
| Glycerin | 10.0 |
| Propylene glycol | 32.0 |
| 'Natrosol' 250 HH | 2.0 |
| Purified water | 30.0 |

The griseofulvin is dissolved in a mixture of the benzyl alcohol and dimethyl phthalate with warming. The propylene glycol and the glycerin are then added with stirring followed by the purified water. 'Natrosol' 250 HH is then added and the mixture is stirred until a uniform gel is obtained. It is either warmed to 40°C. or left to stand until clear. It should be stored in a warm place.

Example 12

| | |
|---|---|
| Griseofulvin | 1.0 |
| Benzyl alcohol | 16.0 |
| Dimethyl phthalate | 9.0 |
| Glycerin | 10.0 |
| Propylene glycol | 32.0 |
| 'Edifas' B Grade B.X. 100 | 3.0 |
| Purified water | 29.0 |

The griseofulvin is dissolved in the benzyl alcohol by gentle warming. The dimethyl phthalate, glycerin and propylene glycol are then added in turn and mixed, followed by the purified water. 'Edifas' B Grade B.X. 100 is then added cautiously with fast stirring until gelation is complete. An opaque diphasic gel is obtained. Examples 13 and 14 illustrate emulsions containing griseofulvin.

Example 13

| | |
|---|---|
| Griseofulvin | 0.50 |
| Benzyl alcohol | 12.0 |
| Dimethyl phthalate | 12.0 |
| Cetostearyl alcohol | 20.0 |
| Cetomacrogol 1000 | 5.0 |
| 'Hibitane' Gluconate | 0.080 |
| Purified water | to 50.42 |

The griseofulvin is dissolved by heating to 70°C. in the mixture of benzyl alcohol and dimethyl phthalate. This is added with stirring to a fused mixture at 70°C. of cetostearyl alcohol and cetomacrogol 1000. A solution of the 'Hibitane' gluconate in the purified water at 80°C. is then added and the mixture is stirred rapidly with slow cooling until an emulsion has formed. This is then passed through an homogeniser to yield a cream preparation.

Example 14

| | |
|---|---|
| Griseofulvin | 0.70 |
| Benzyl alcohol | 10.0 |
| Arachis oil | 15.0 |
| Cetostearyl alcohol | 12.0 |
| 'Topanol' B.H.T. | 0.05 |
| Citric acid | 0.02 |
| Sorbitan monostearate | 2.0 |
| Polysorbate 60 | 2.0 |
| Purified water | 58.23 |

The griseofulvin is dissolved in the benzyl alcohol by warming to 70°C. with stirring. This solution is then added with continuous stirring to a fused mixture (at 70°C.) of the arachis oil, cetostearyl alcohol and 'Topanol' B.H.T., sorbitan monostearate and polysorbate 60 at the same temperature. A solution of the citric acid in the purified water is then added at 80°C. and the mixture is stirred rapidly with cooling until an emulsion has formed. This is then passed through an homogeniser to yield a cream preparation. Examples 15 and 16 illustrate ointments containing griseofulvin.

Example 15

| | |
|---|---|
| Griseofulvin | 0.50 |
| Benzyl alcohol | 10.0 |
| Sorbitan monostearate 60 | 3.0 |
| White soft paraffin | 86.5 |

The griseofulvin is dissolved in the benzyl alcohol at 70°C. and is poured with rapid stirring into a fused mixture of the sorbitan monostearate and white soft paraffin. The mixture is allowed to cool with suitable stirring until a diphasic ointment is formed.

Example 16

| | |
|---|---|
| Griseofulvin | 0.70 |
| Benzyl alcohol | 10.0 |
| Propylene glycol | 10.0 |
| Wool fat | 5.0 |
| Sorbitan monostearate | 3.0 |
| White soft paraffin | 71.3 |

The griseofulvin is dissolved in a mixture of the benzyl alcohol and propylene glycol at 70°C. The solution is added slowly with fast stirring to a fused mixture of the wool fat, sorbitan monostearate and white soft paraffin maintained at the same temperature. The mixture is allowed to cool with fast stirring until a uniform composition is formed.

Example 17

A gel having the composition:
| | |
|---|---|
| Griseofulvin | 2.5 |
| Benzyl alcohol | 33.0 |
| Dimethyl phthalate | 14.0 |
| Propylene glycol | 40.0 |
| 'Carbopol' 940 | 1.2 |
| Triethanolamine | 0.24 |
| Purified water to | 100 | is made by the same procedure as described for Example 10.

What we claim is:

1. A gel consisting essentially of a solution of griseofulvin in a mixture of benzyl alcohol and dimethyl phthalate, a diluent selected from the group consisting of propylene glycol and glycerol, and a gelling amount of a gelling agent selected from the group consisting of carboxypolymethylene, hydroxyethylcellulose and sodium carboxymethylcellulose, said gel containing from 0.25 percent w/w to 5 percent w/w of griseofulvin, the amount of griseofulvin present being sufficient to treat a fungal skin infection effectively by topical application.

2. The gel of claim 1 which contains from 1 to 3 percent w/w of griseofulvin.

3. The gel of claim 1 which contains from 0.25 – 5 percent w/w of griseofulvin, 15 – 40 percent w/w of benzyl alcohol, 5 – 25 percent of dimethyl phthalate, and 35 – 55 percent w/w of propylene glycol or a mixture of propylene glycol and glycerol, together with a gelling amount of the gelling agent.

4. The gel of claim 3 which contains from 1 to 3 percent w/w of griseofulvin.

* * * * *